(12) United States Patent
Chapman

(10) Patent No.: X8081
(45) Date of Patent: Mar. 15, 1834

(54) SHINGLES, SHAVING & JOINTING

(76) Inventor: Samuel B. Chapman

Samuel B. Chapman, Camden, New Jersey.
Letters Patent
Dated March 15th 1834. Reissued June 12th 1835.

The Schedule referred to in these Letters Patent and making part of the same
containing a description in the words of the said Saml. B. Chapman himself of his
improvement in shaving and jointing shingles, Patented to him on the fifteenth day
of March 1834, which Patent being hereby cancelled on account of an incorrect specif-
ication:

---

To all whom it may concern: Be it known that Saml. B. Chapman of Camden
in the County of Gloucester, and State of New Jersey, have invented an improvement in
a new and useful machine for shaving and jointing shingles of which an imper-
fect and defective specification or description was given, and attached to Letters Pa-
tent of the United States, granted to me on the fifteenth day of March 1834, and I do
hereby declare that the following is such a full and exact description thereof as I believe
fulfills the requirements of the law in all respects, which the former, through inadverten-
and want of proper information failed to do. A strong bench is to be made by framing
suitable timber together to form the sides, ends, legs and cross pieces. Its size may vary to
suit the place it is intended for. In ordinary cases it may be about nine feet long three feet
wide and two feet high. Upon one end of the bench I place a frame, usually of cast iron
which is to contain a pair of rollers between which the shingles are to pass in their way
to the knives, behind them the knives, and behind them another pair of rollers to re-
ceive the shingle as it leaves the knives. The frame is quadrangular, and an iron post
or standard rises at each of its corners. The two front posts contain the two front rollers
The lowermost of which is so fixed that its upper side rises a little above the plane or plat-
form of the bench; this roller serves to conduct the shingle against the lower knife. The upper
roller stands immediately over the lower one, its gudgeons revolving in a sliding frame which
allows it to rise and fall, being guided by grooves in the posts or standards, the frame is forc-
ed down by a strong bow string, or by spiral or other springs, as may be preferred, the object
being to keep the roller in constant contact with the shingle. Instead of this upper front rol-
ler I sometimes form the sliding frame with its lower surface flat, and allow this to be forced
down upon the shingle in the way described when the stuff is twisted, or uneven, this I
think may be preferred to the roller. There are two rollers at the back of the frame corresit from one standard to the other in the same plane with the front roller, the upper roller
being borne down exactly in the way described, they serve to receive the shingle as it is being
shaved, and to keep it in its place between the knives. The iron frame, sustaining the
rollers and other parts, may be about two feet long measuring across the platform, and
about one foot deep from front to back. The knives stand across the platform, the lower one
being fixed thereto, is stationary, its edge of course being so fixed as to take a shaving from
the lower side of the shingle, as it passes from roller to roller. The upper knife is
placed exactly above the lower, and is capable of approaching to or receding from it
for the purpose of regulating the varying thickness of the shingle, it being made to ap-
proach, as the shingle passes through, in a way to be presently described. The knives
may be about four inches wide, and one and a half inches thick, and for the purpose
of applying the guages which regulate their distance apart, they are made sufficient-
ly long to project at each end beyond the iron frame. The upper knive is borne upon two
iron blocks which by means of tongues and grooves, slide up and down between the iron
posts or stanards, at each end of the frame, an iron sliding guage passes between the
ends of the knives in a way to be presently described, and serves to keep them at the
intended distance apart. From each of the iron blocks which press upon the upper
knife, vertical rods rise, and they are connected together at the upper ends by a hori-
zontal cross bar. An eccentric may be made to operate upon this cross bar, simulta-
neously with the passage of the shingle between the knives, so as to force the upper knife
down as the shingle advances, and to raise it when another is to be passed through. Oth-
er modes however may be resorted to for forcing the knives down as will appear here-
after. Along the middle of the table there is a groove, which serves as a guide to the driver
or pitman, which is to force the shingle forward. The driver is a piece of hard plank
six or eight inches wide, which being forced on by the action of a crank, upon a rod,
or bar, to one end of which it is attached, causes the unshaved shingle, which is laid
upon the platform, to be forced in between the rollers and knives, and this in its turn
is forced out by the next following shingle. This driver makes in fact a part of a sliding
frame which lies upon the bench. Another part of this sliding frame, consisting of two
iron rods which extend back, and constitute the guages between the knives. A cross bar fas-
tened by its middle to the rod to which the driver is attached, has an iron bar or rods fastened
to each of its ends, so as to [illegible] upon the frame of the bench, and to extend back between the knives, which these rods are tapered, as the shingle is in thickness after it is dress
ed. These guage rods, being driven on at the same time with the shingle determine its
thickness, the upper knife being forced down upon it by the iron block, and eccentric,
which eccentric may be fixed to a shaft, and receive its motion from the same power
which drives the crank shaft. Instead of using the eccentric in the way described, the guage
rods may each be made double where they operate upon the upper knife, one part passing
above, and the other below, the end of the moveable knife. these two parts must then be
tapered equally, and in reversed directions, and the upper side of the upper rod must bear
and slide against a fixed block or obstacle. The same principle may be applied if desired
to cause the knives each to advance towards the other which will undoubtedly shave the
shingle more smoothly than when one knife only advances. The pointing is effected by mean
of pointers which lie upon the platform, in front of the iron frame, one, on each side of the shin
gle. They have each three or [illegible], are confined so as to slide towards each other, and are
borne together by springs, these do not differ materially from such as have before been used,
and do not need, therefore to be particularly described, but the drawing deposited in the Patent
Office will show their construction and that of the other parts of the apparatus. I sometimes
perform the pointing and shaving at distinct operations, as shorter cranks answer the
purpose than that necessary to effect both at once. The same crank shaft may in this
case have two cranks upon it, the bench being widened out for this purpose.

What I claim as my invention is the manner of fixing the knives within the iron
frame and the giving to one or both of them a vertical motion only, for the purpose and
in the manner, or upon the principle herein set forth. I also claim the use of rollers or
segments of rollers, to contain the pressure upon the shingle after it has passed in part
through the knives.

Jonan Atkinson
Edward Harris
[illegible] Sam B Chapman

[illegible]